(12) United States Patent
Glück

(10) Patent No.: US 12,065,956 B2
(45) Date of Patent: Aug. 20, 2024

(54) METHOD FOR OPERATING AN EXHAUST SYSTEM

(71) Applicant: AUDI AG, Ingolstadt (DE)

(72) Inventor: Christian Glück, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/125,646

(22) Filed: Dec. 17, 2020

(65) Prior Publication Data

US 2021/0189929 A1  Jun. 24, 2021

(30) Foreign Application Priority Data

Dec. 19, 2019  (DE) .......................... 102019135090.5

(51) Int. Cl.
*F01N 3/027* (2006.01)
*B60R 16/03* (2006.01)

(52) U.S. Cl.
CPC .............. *F01N 3/027* (2013.01); *B60R 16/03* (2013.01)

(58) Field of Classification Search
None
See application file for complete search history.

(56) References Cited

U.S. PATENT DOCUMENTS

2012/0277973 A1 * 11/2012 Gonze ................... F01N 3/2013
                                                             701/102
2014/0060014 A1 *  3/2014 Gonze ....................... F01N 9/00
                                                              60/286

FOREIGN PATENT DOCUMENTS

| DE | 198 46 319 C1 | 2/2000 | |
|---|---|---|---|
| DE | 100 36 762 C1 | 1/2002 | |
| DE | 100 42 524 A1 | 3/2002 | |
| DE | 102 48 415 A1 | 5/2004 | |
| DE | 10 2012 021 057 A1 | 4/2014 | |
| DE | 10 2013 218 127 A1 | 3/2015 | |
| DE | 10 2013 205 314 B4 | 9/2016 | |
| EP | 0763650 A1 * | 3/1997 | ............ H02J 7/1438 |
| EP | 2 546 487 A1 | 1/2013 | |

* cited by examiner

*Primary Examiner* — Rexford N Barnie
*Assistant Examiner* — Terrence R Willoughby
(74) *Attorney, Agent, or Firm* — Seed IP Law Group LLP

(57) ABSTRACT

A method for operating an exhaust system of a vehicle having an internal combustion engine upstream of the exhaust system and having an energy network is provided. The method includes operating the energy network in an operating situation with a voltage at a starting position, wherein a heating element is associated with the exhaust system, the heating element being connected to the energy network via a switching element, wherein the heating element in a first switching state of the switching element, when the switching element is switched on, is connected to the energy network in an electrically conductive manner, and in a second switching state of the switching element, when the switching element is switched off, is electrically separated from the energy network, and changing the voltage from the starting position to a switchover position when switching the switching element between the first and second switching states.

8 Claims, 1 Drawing Sheet

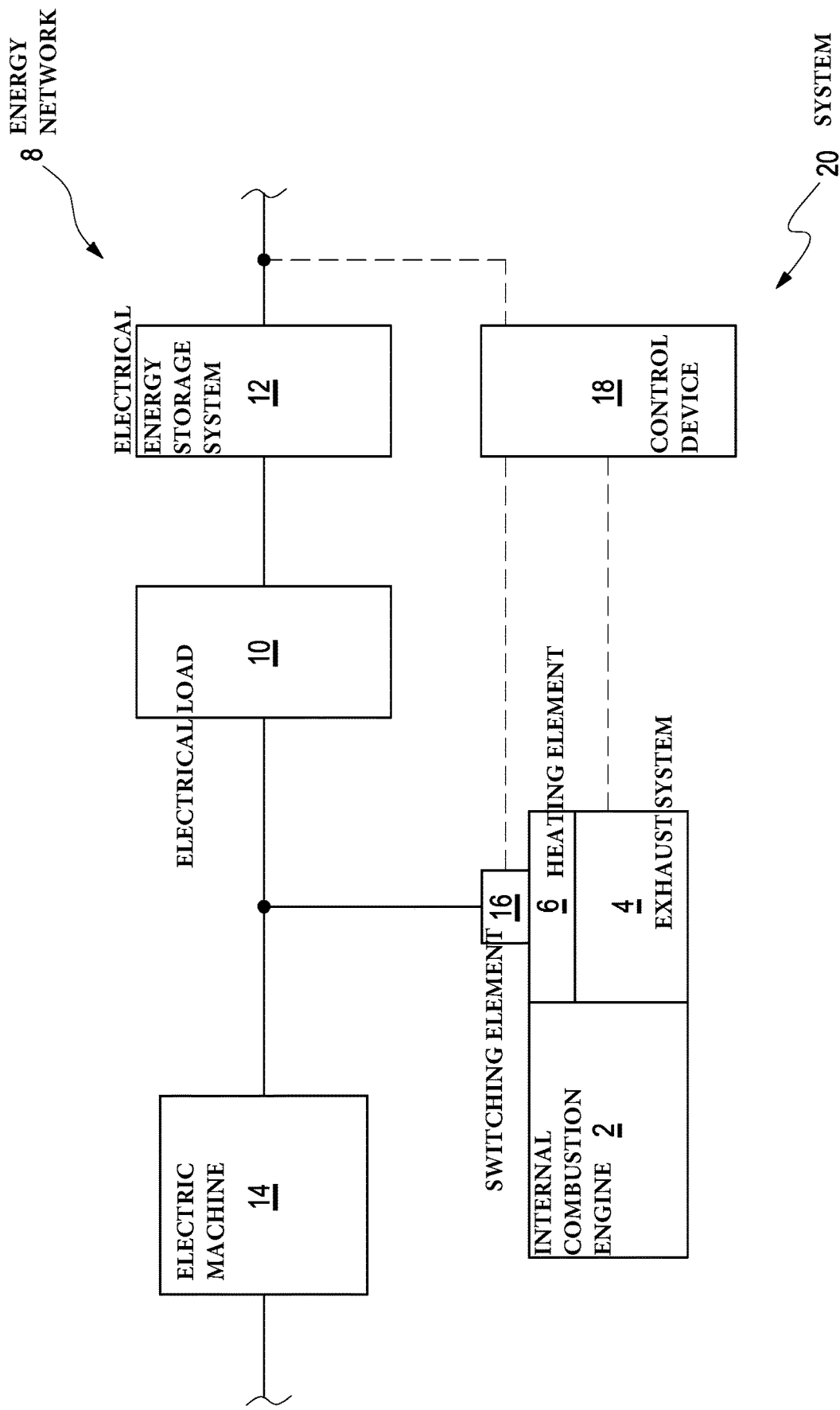

METHOD FOR OPERATING AN EXHAUST SYSTEM

BACKGROUND

Technical Field

Embodiments of the invention relate to a method for operating an exhaust system of a vehicle and a system for operating an exhaust system.

Description of the Related Art

To operate an exhaust system of a vehicle, it can be advantageous to heat it to a suitable operating temperature.

Document DE 100 42 524 A1 describes a voltage supply for a motor vehicle.

An energy supply circuit for a motor vehicle on-board electrical system with two voltage supply branches is known from document DE 198 46 319 C1.

A vehicle and a method for electrifying a catalytic converter are described in document EP 2 546 487 A1.

BRIEF SUMMARY

Against this background it was an object to control a heating element for an exhaust system of a vehicle in a simple manner.

An embodiment of a method according to the invention is designed for operating an exhaust system of a vehicle which has an internal combustion engine with the exhaust system being downstream, and an energy network. In a current, original and/or respective operating situation, for example, the energy network is initially operated with a voltage at a starting position. A heating element is associated with the exhaust system and the heating element is connected to the energy network via a switching element. In a first switching state of the switching element, when the switching element is connected or switched on, for example is being or is closed, the heating element is being or is connected to the energy network in an electrically conductive manner. In addition, in a second switching state of the switching element when the switching element is switched off or turned off, for example is opened, the heating element is being or is electrically separated from the energy network. When the switching element is switched over between the two switching states, the voltage of the energy network is set, starting from the starting position, to a switchover position as the voltage position or to a switchover level.

The method can be carried out for a vehicle which can be designed or referred to as a motor vehicle or car. In this case, the vehicle can furthermore be driven by the internal combustion engine as the drive unit and/or by the at least one electric machine as the drive unit, as required, wherein the vehicle with several drive units can be designed or referred to as a hybrid vehicle. If the at least one electric machine is operated as a motor, inter alia when switching over, it converts electrical energy from at least one electrical energy storage system, for example a battery, of the vehicle, which electrical energy storage system is also integrated into the energy network, into mechanical energy for driving the vehicle. If the at least one electric machine is operated as a generator, it converts mechanical energy of the vehicle into electrical energy, which is stored in the at least one electrical energy storage system.

In a configuration, in an operating situation, the voltage of the energy network is lowered or reduced to the switchover position starting from the starting position, wherein it is possible that the at least one electric machine that is integrated in the energy network, when switching over, in this case, when lowering the voltage from the starting position from, for example, approx. 43 V to the switchover position of, for example, a maximum of approx. 40 V, is operated as a motor.

In an alternative configuration, in an operating situation, the voltage of the energy network is increased or raised starting from the starting position to the switchover position, wherein it is possible that the at least one electric machine that is integrated into the energy network, when switching over, in this case, when increasing the voltage, is operated as a generator.

In the method, in the respective operating situation, the voltage is set by the at least one electric machine, starting from the respective set and/or prevailing starting position, to a respectively intended switchover position, and thus an optimum voltage level for switching over. Furthermore, the voltage, starting from the switchover position, is set by the at least one electric machine to an optimum voltage position or standard position intended for the further operation of the vehicle and/or energy network.

Usually, the energy network is operated in a standard operation as the current operating situation with a voltage at a standard position as the starting position or at a standard level for the voltage of approx. 43 V, for example. When switching over the switching element between the two switching states, the voltage of the energy network, starting from the standard position as the starting position, is lowered to the switchover position as the voltage position or to a switchover level of not more than approx. 40 V, and thus set. This can prevent the voltage of the energy network from being raised to too high a value by a connecting pulse as the switchover pulse.

In a further configuration of the method, in a starting operation of the vehicle as the current operating situation, for example, in the case of a cold energy storage system or a cold battery, the energy network is operated with a voltage on a launch position as the starting position, wherein, when switching over the switching element between the two switching states, the voltage of the energy network is set, in this case is increased or raised, starting from the launch position as the starting position to the switchover position. This can prevent the voltage of the energy network from being lowered to too low a value by the connecting pulse as the switchover pulse.

Typically, the voltage in each case is then lowered to the switchover position of, for example, not more than 40 V when the switching element during switchover, for example, connecting, is connected, and/or when the switching element during switchover, for example, switching off, is switched off. Thus, in a configuration, the voltage or voltage position is lowered only when switching over from the standard position to the switchover position. Accordingly, after the switching over, the voltage position is raised or increased from the switchover position back to the standard position. Thus, when the switching element is in the first switching state and is connected or closed, the heating element for the exhaust system is supplied with voltage at the standard position of, for example, approx. 43 V from the energy network.

In a further configuration, when switching over the switching element between the two switch states, the voltage is lowered to a reduced switchover position or a reduced switchover level of, for example, not more than approx. 36

V, which is even lower than the aforementioned higher switchover level of, for example, approx. 40 V.

It is possible that the starting position, for example the standard position, of the voltage has a value of approx. 43 V, approx. 48 V or approx. 52 V, and that the switchover position of the voltage has a value of approx. 50 V, approx. 40 V or approx. 36 V.

Possible values for the standard position as a possible starting position of the voltage and the switchover position reduced to said value, usually depend on a respective configuration of the energy network or on-board network of the vehicle and the respective operating situation.

In this case, the value for the standard position is usually defined or fixed, wherein a value defined in such a way for the standard position, during operation, can fluctuate within the scope of usual tolerances by a tolerance value of a few percent, for example, 1% to 2%. It must be taken into account in this case that the value of the switchover position, during operation, can also fluctuate by a tolerance value of a few percent, for example, 1% to 2%, regardless of its intended ratio to the value of the standard position.

The following relationship can apply to a ratio of the value of the standard position as the starting position to the value of the switchover position:

((Value of the voltage of the standard position minus the value of the voltage of the switchover position)) divided by (value of the voltage of the standard position).

If the standard position is 43 V, for example, the switchover position can be 40 V or 36 V, depending on the embodiment.

Accordingly, the value of the switchover position for the voltage is lower than the value of the standard position for the voltage by at least 5% to 10%, for example, (43 V-40 V)/43 V~7%, or by 10% to 15% or 20%, for example, (43 V-36 V)/43 V~16%.

If, on the other hand, the voltage is increased from the launch position as the starting position to the switchover position, a ratio of the launch position as the starting position to the switchover position can depend on which switchover voltage is required for switching over and which launch position the voltage originally has, the launch position being lower than the standard position and the switchover position.

As soon as the heating element is connected to the energy network via the connected switching element, it is supplied with electrical energy from the energy network and warmed or heated depending on the definition, the exhaust system being warmed or heated by the heating element depending on the definition. Then, the switching element is connected when a respective current or currently measured or determined temperature is lower than an operating temperature which the exhaust system must have for purifying exhaust gases of the internal combustion engine. For warming or heating of the exhaust system with the heating element, the heating element is connected to the energy network for a period of time via the switching element, during which period of time the voltage is at the starting position, for example, standard position, the heating element during this period of time being provided the voltage from the energy network. Only for switching over, that is to say for initiating the heating and terminating the heating of the exhaust system, the voltage is lowered to the switchover position starting from the standard position.

An embodiment of a system according to the invention is designed for operating an exhaust system of a vehicle having an internal combustion engine with the exhaust system being downstream, and an energy network. In a respective operating situation, the energy network has, first, a voltage having a starting position, for example, a standard position in a continuous operation as an operating situation of the vehicle or having a launch position when launching as the operating situation of the vehicle. The system has a heating element and a switching element, the heating element being associated with the exhaust system, for example being arranged in the exhaust system, the heating element being connected to the energy network via the switching element. The heating element is or is being connected to the energy network in an electrically conductive manner in a first switching state of the switching element when the switching element is or is being connected. In a second switching state of the switching element, when the switching element is or is being switched off, the heating element is or is being electrically separated from the energy network. When the switching element is switched over between the two switching states, the system is designed to set the voltage of the energy network to a switchover position starting from the starting position.

In a standard operation as the operating situation, the energy network has a voltage at a specific standard position provided for this purpose or at a standard level as the starting position of, for example, approx. 43 V. When switching over the switching element between the two switching states, that is to say, when switching over from the first to the second switching state, but also when switching over from the second to the first switching state, the voltage of the energy network is lowered to a specific switching position provided for this purpose or to a switchover level of, for example, not more than approx. 40 V.

In this case, the system is usually designed to set the voltage starting from the starting position to a respectively intended voltage position, i.e., to the standard position at a continuous operation of the energy system or to the switchover position for switching over the switching element. For this purpose, in a configuration, the system may have a control device and at least one electric machine which is or are designed to determine a respectively intended switchover position and set the voltage from the starting position to the switchover position and again from the switchover position to the starting position. In this way, the voltage position in the energy network or of the energy network is lowered to the switchover position by the control device and/or the at least one electric machine, starting from the standard position as the starting position, and is increased from the switchover position to the standard position as the starting position. Alternatively, the voltage level in the energy network or of the energy network is raised by the control device and/or the at least one electric machine from the launch position as the starting position to the switchover position and lowered from the switchover position to the launch position as the starting position. However, it is conceivable that the voltage position, after having been raised, first, by the control device and/or the at least one electric machine, from the launch position to the switchover position, is set to the standard position for the respective operating situation by the control device and/or the at least one electric machine, wherein it is possible that the voltage position is raised from the switchover position to the standard position if the standard position in the operating situation is higher than the switchover position, or is lowered from the switchover position to the standard position if the standard position in the operating situation is lower or less than the switchover position.

The heating element is designed as an ohmic resistance and/or as a load which is, in the event that the switching element is connected, supplied directly with electrical energy from the energy network or on-board network and continues to be warmed or heated. The exhaust system, which is further warmed or heated with the heating element, can have a catalytic converter and/or be designed as a catalytic converter.

With the method, the heating element can be controlled, activated, and/or operated as heat source for the exhaust system via the switching element.

The method and the system are provided as a concept to simplify a control of an electric catalytic converter (eCat) as exhaust system of a vehicle designed as a hybrid vehicle (mHEV plus 48 V eCat), e.g., a mild hybrid vehicle. In this case, the standard position of the voltage in the energy network and/or on-board network of the vehicle, i.e., the operating voltage, in standard operation, can be approx. 48 V be. In this case, the switchover position of the voltage can be approx. 40 V or approx. 36 V. Accordingly, the ratio of the value of the standard position to the value of the switchover position can be according to (value of the standard position–value of the switchover position)/(value of the standard position)=at least 15%, for example, 16.67% to not more than 25%.

In this case, a simple switch concept is provided for switching over the electrical catalytic converter, i.e., for connecting the electrical catalytic converter, for operating the electrical catalytic converter and for switching off the electrical catalytic converter.

In this case, the electric resistance is operated as a heating element of the electrical catalytic converter at or with a preferred voltage, i.e., operating voltage, at the standard position of, for example, 43 V. This voltage of, for example, 43 V is generally not undershot when the vehicle is in traction mode and can be kept constant via the at least one electric machine operated as a generator. During recuperation the voltage in the energy network rises up to 52 V, as a result of which the power generated by the heating element increases at the electrical catalytic converter as the exhaust system, which is not problematic, as it cannot result in damage because a mass flow of exhaust gas of the internal combustion engine (ICE) is always sufficient, which is why a higher heating power of the electrical resistance has a positive effect. Accordingly, depending on the operation, the voltage in the energy network can temporarily be higher or greater than the defined standard position. In this case too, the heating element, if it is connected to the energy network via the connected switching element, can be supplied with electrical energy with the temporarily increased voltage above the standard position. If the starting position of the voltage, depending on the definition of the standard position or launch position, is at approx. 52 V during recuperation, it is possible that the voltage is reduced to, for example, 50 V as a switchover position in order to avoid overvoltage.

The switchover, i.e., connecting and switching off, can be performed at voltages starting from the standard position of, for example, 43 V, in a range for the switchover position smaller approx. 40 V, for example, approx. 36 V in order to keep a load peak as small as possible. Lowering the voltage can be achieved if the at least one electric machine or electrical machine, for example, several electric machines, briefly provide a high motor performance. This results in high discharge currents at an electrical energy storage system formed, for example, as a battery, as a result of which the voltage at the electrical heating element associated with the exhaust system with the catalytic converter decreases significantly, wherein a switchover, i.e., connecting or switching off, is possible for the energy network without any large voltage and current peaks.

The method can be implemented in different operating situations of the vehicle, a specific function being carried out in a respective operating situation. The method can be carried out when the vehicle drives or is driven electrically, in particular purely electrically, when a boost function or a boosting is carried out in which mechanical energy for driving or moving the vehicle is generated jointly by the electric machine operated as an electric motor in this case and the internal combustion engine, or when a momentum is generated against a brake.

In the method, at least one ohmic load and/or resistance is used as a heating element for the exhaust system. The connection and switching off is carried out via or with a simple switching element, wherein an electrical DC converter (DC-DC) or a pulse width modulation (PWM) can be dispensed with. In the method, when connecting or switching off the heating element, the voltage is lowered or raised, for example, to approx. 36 V to 40 V via the at least one electric machine, wherein the voltage-dependent connecting and switching-off performance is brought to a level acceptable for the energy network.

The switching element or switch concept used is very simple, very compact, inexpensive and has no cooling requirements. By means of the method, the electrical catalytic converter as an exhaust system is sufficiently warmed or heated by the heating element that is supplied with electric energy or voltage from the energy network, and can thus generate sufficient heat capacity for a secure emission of exhaust gas.

During connecting and switching off, the voltage of the energy system is briefly, i.e., at least during a respective switchover, set, that is to say, either lowered or raised.

During boost operation or boosting as an operating situation, when the vehicle is driven by the internal combustion engine and the at least one electric machine with a power of, for example, approx. 20 kW, the voltage may be lowered to approx. 40 V to 36 V. The heating element can, for example, have an electrical resistance R~2.1 ohms. In this case the following applies to its power, for example, nominal power, $P=U^2*R$ depending on a respective voltage U: P (43 V)~4 kW, P (52 V)~5.7 kW and P (36 V)~2.7 kW.

By lowering the voltage when a hybrid function is performed, the switchover capacity can, when switching over, i.e., connecting capacity when connecting and/or switching-off capacity when switching off, be brought to a level which is safe for the energy network. By lowering the voltage when switching over, a high voltage dependency of the heating element can be compensated and/or taken into account as an ohmic heating load. The lowering of the voltage when performing the hybrid function therefore enables the use of a switch concept in which, for example, a DCDC converter is not absolutely necessary. The heating element used in the context of the method or system is more favorable or less expensive in comparison to conventional heaters and has only minimal space requirement. In addition, otherwise required active components, for example, cooling, can be dispensed with.

It should be understood that the features mentioned above and those yet to be explained below can be used not only in the respectively specified combination, but also in other combinations or on their own, without leaving the scope of the present disclosure.

BRIEF DESCRIPTION OF THE SEVERAL VIEWS OF THE DRAWINGS

Aspects of the invention are illustrated schematically in the drawing.

FIG. 1 shows in schematic illustration a system for operating an exhaust system of a vehicle.

DETAILED DESCRIPTION

FIG. 1 shows in a schematic illustration an internal combustion engine 2 of a vehicle, in this case of a motor vehicle or car, with a downstream exhaust system 4 for purifying exhaust gas from the internal combustion engine 2. In this case, the exhaust system 4 has a heating element 6. As a further component of the vehicle, an energy network 8 is illustrated schematically in FIG. 1 as an on-board network of the vehicle, with at least one electrical load 10 and at least one electrical energy storage system 12 being incorporated or integrated into this energy network 8 as an electrical energy source, for example, a battery, of the vehicle. In addition, an electric machine 14 is also integrated into the energy network 8, which electric machine 14 can drive the vehicle, which is designed as a hybrid vehicle, as an alternative or in addition to the internal combustion engine 2, when the electric machine is operated as a motor and converts electrical energy into mechanical energy. Furthermore, the vehicle can be slowed down with the electric motor 14 with conversion of kinetic energy into mechanical energy when the electric machine 14 is operated as a generator and thus also as an energy source, wherein a recuperation can be carried out also.

FIG. 1 also shows a switching element 16, via which the heating element 6 is connected to the energy network 8, and a control device 18. In this case, the control device 18 is associated with the energy network 8 and is also connected to the switching element 16 and the exhaust system 4 via the energy network 8. The control device 18 is designed to set a voltage position and thus a value of an electrical voltage in the energy network as required.

The heating element 6, the switching element 16 and the energy network 8, at least the electric machine 14 arranged therein, and the control device 18 are designed here as components of the embodiment of the system 20.

The switching element 16 is connected or switched on in a first switching state and connects the heating element 6 to the energy network 8 electrically. In a second switching state, the switching element 16 is switched off or turned off and separates the heating element 6 from the energy network 8.

In standard operation, the energy network 8 has a voltage with a standard position as a voltage position of approx. 43 V or is operated with a voltage of 43 V.

In the embodiment of the method for operating an exhaust system 4 is first provided, that the switching element 16 is switched off and thereby separates the heating element 6 from the energy network 8. A respective temperature of the exhaust system is detected by the control device 18.

Since the exhaust system 4 for purifying the exhaust gases from the internal combustion engine 2 should have a minimum operating temperature intended for this purpose, it is provided that it is heated with the heating element 6 if the control unit 18 determines that the temperature of the exhaust system 4 is lower than its operating temperature intended for this purpose.

For this purpose, it is provided that in a standard operation as the operating situation, the standard position as the starting position of the voltage of the energy network 8 of hitherto 43 V is controlled by the control device 18 at a switchover position of not more than 40 V, then lowered and the switching element 16 is switched over by the control device 18 by connecting, the heating element 6 being provided with electrical energy from the energy network 8 via the now closed switching element 16, wherein the heating element 6 is warmed and/or heated and the exhaust system 4 is also warmed and/or heated depending on the definition. In this case, the electric machine 14 is operated as a motor for lowering the voltage.

After switching over, in this case connecting, the embodiment of the method provides for the voltage position in the energy network 8 to be raised again to the standard position of 43 V by the control device 18, starting from the switchover position. As soon as the exhaust system 4 has reached its operating temperature, it is provided that the switching element 16 is switched over by the control device 18 by switching off. In this case also, the voltage in the energy network 8 is lowered again to the lower switchover position of not more than 40 V for switching over, here switching off, the switching element 16 and the heating element 6 is separated from the energy network 8. After switching off, the voltage is raised again to the standard position of approx. 43 V by the control device 18.

In an alternative configuration of the method, it is possible that the vehicle and/or the energy network 8 is launched, the energy network 8 having a voltage with a launch position as the starting position that is lower than the standard position and lower than the switching position, when starting as an operating situation when the energy storage system 12 is still cold. In this case, the voltage in the energy network 8 is raised from the launch position to the switchover position, wherein the electric machine 14 can be operated as a generator. Thereafter, the voltage can be raised or lowered to the standard position depending on whether the switchover position is higher or lower than the standard position, the electric machine 14 being operated as a generator to raise the voltage and as a motor to lower the voltage.

German patent application no. 10 2019 135090.5, filed Dec. 19, 2019, the priority of which is claimed herein, is hereby incorporated herein by reference, in its entirety.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of operating an exhaust system of a hybrid vehicle having an internal combustion engine upstream of the exhaust system and at least one electric machine that moves the hybrid vehicle and having an energy network including at least one electrical energy storage system electrically coupled to the at least one electric machine, the method comprising:
   operating the energy network including the at least one electrical energy storage system electrically coupled to the at least one electric machine in an operating situation with a voltage at a starting voltage,
   wherein a heating element is associated with the exhaust system, the heating element connected to the energy network via a switching element,
   wherein the heating element in a first switching state of the switching element, when the switching element is switched on, is connected to the energy network including the at least one electrical energy storage system and the at least one electric machine in an electrically conductive manner, and in a second switching state of the switching element, when the switching element is switched off, is electrically separated from the energy network including the at least one electrical energy storage system and the at least one electric machine;

changing, with a control device, the voltage of the energy network including the at least one electrical energy storage system electrically coupled to the at least one electric machine from the starting voltage to a switchover voltage before switching the switching element from the first switching state to the second switching state; and changing, with the control device, the voltage of the energy network including the at least one electrical energy storage system electrically coupled to the at least one electric machine from the switchover voltage to the starting voltage before switching the switching element from the second switching state to the first switching state.

2. The method according to claim 1, wherein the switchover voltage is higher than the starting voltage.

3. The method according to claim 1, wherein the switchover voltage is lower than the starting voltage.

4. The method according to claim 1, wherein the at least one electric machine included in the energy network is operated as a motor or as a generator during the switching of the switching element between the first and second switching states.

5. The method according to claim 1, wherein the energy network is operated in a standard mode with a voltage on a standard voltage as the starting voltage, wherein, when the switching element is switched over between the first and second switching states, the voltage of the energy network is changed from the standard voltage to the switchover voltage.

6. The method according to claim 1, wherein the starting voltage of the voltage has a value of approximately 43 V, approximately 48 V, or approximately 52 V, and wherein the switchover voltage of the voltage has a value of approximately 50 V, approximately 40 V, or approximately 36 V.

7. A system for operating an exhaust system of a hybrid vehicle having an internal combustion engine upstream of the exhaust system and at least one electric machine that moves the hybrid vehicle and having an energy network including at least one electrical energy storage system electrically coupled to the at least one electric machine, wherein the energy network including the at least one electrical energy storage system electrically coupled to the at least one electric machine in an operating situation has a voltage with a starting voltage, the system comprising:

a heating element;

a switching element; and a control device coupled to the switching element, wherein the heating element is associated with the exhaust system, the heating element connected to the energy network via the switching element, wherein the heating element in a first switching state of the switching element, when the switching element is switched on, is connected to the energy network including the at least one electrical energy storage system and the at least one electric machine in an electrically conductive manner, and in a second switching state of the switching element, when the switching element is switched off, is electrically separated from the energy network including the at least one electrical energy storage system electrically coupled to the at least one electric machine, wherein the control device is configured to change the voltage of the energy network including the at least one electrical energy storage system electrically coupled to the at least one electric machine from the starting voltage to a switchover voltage before switching the switching element from the first switching state to the second switching state, and wherein the control device is configured to change the voltage of the energy network including the at least one electrical energy storage system electrically coupled to the at least one electric machine from the switchover voltage to the starting voltage before switching the switching element from the second switching state to the first switching state.

8. The system according to claim 7, wherein the heating element provides an ohmic resistance.

* * * * *